Patented June 15, 1937

2,084,038

UNITED STATES PATENT OFFICE 2,084,038

VULCANIZATION OF RUBBER

Joy G. Lichty, Stow, Ohio, assignor to Wingfoot Corporation, Wilmington, Del., a corporation of Delaware No Drawing. Application November 10, 1933, Serial No. 697,535

26 Claims. (Cl. 18—53)

This invention relates to a class of novel compounds, the members of which, either as such or in conjunction with other substances, are useful as accelerators of the vulcanization of rubber. It relates, among other things, to a method of accelerating the processes of vulcanization by incorporating in the unvulcanized stock certain novel compounds which not only are comparatively easy to prepare, but also serve to impart desirable physical properties to the vulcanized product. The novel compounds with which the invention deals may be described as aromatic acyl, or aroyl alkyl esters of dithiocarbamic acids.

Illustrative of the compounds to which the invention relates is the type formula

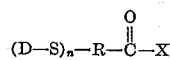

wherein X is an aromatic radical, D is a thiocarbamyl group, $n$ is one or more, and R is an alkyl group. The aromatic radical X may be, for example, a phenyl, naphthyl or anthracyl radical, substituted or unsubstituted by such substituents as nitro, halogen, hydroxy, alkoxy, alkyl, amino and like groups. The thiocarbamyl group D is more specifically the group

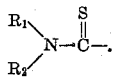

In the latter group, $R_1$ and $R_2$ may be like or unlike radicals, or if desired $R_1$ and $R_2$ may be taken together to form a cyclic alkylene chain. Also, either $R_1$ or $R_2$, but not both, may be hydrogen.

In the formula, R represents any alkyl group. Thus, where the ketone employed is a methyl ketone, R is methyl; similarly, where an ethyl ketone is employed, R is an ethyl group. When the compounds are to be employed as accelerators of vulcanization, it will generally be found preferable that the carbonyl group be separated from the dithiocarbamate radical or radicals by a single carbon atom. This may be accomplished by employing halogenated alkyl aryl ketones in which the halogen is attached to the carbon atom of the alkyl group alpha to the carbonyl group.

In general, these compounds may be prepared by simply bringing together in a suitable medium a halogenated alkyl aryl ketone and a salt of a dithiocarbamic acid. In certain cases, a compound forms at once; in others, it may be necessary to allow the mixture to stand for a few hours or to heat the mixture somewhat. In any case, the product forms as a solid or oil which may be easily separated and purified. The reaction is found to proceed with substantially equal facility with either a mono- or di-halogenated alkyl aryl ketone.

As illustrating the preparation of these compounds there may be mentioned the preparation of benzoyl methyl di(dimethyl dithiocarbamate). It is prepared by heating on a steam bath for about ¾ of an hour a mixture containing 47.3 grams of dichlor acetophenone, 0.5 mol. of an aqueous solution of sodium dimethyl dithiocarbamate, and 250 cc. of acetone. The mixture, after having been cooled and diluted by the addition of water, gives rise to a solid which may be filtered off and dried. The crude product so obtained may be partially purified by triturating in the presence of a small volume of ether and filtering off the resulting colorless solid. This purified product has been found to melt at about 167 degrees C. The yield obtained is as a rule about 82.5% of the theoretical. The reaction probably proceeds as follows:

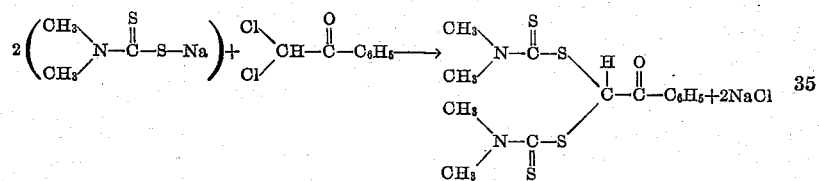

In the preparation of benzoyl methyl di(diethyl dithiocarbamate), a mixture containing 47.3 grams of dichlor acetophenone, 0.5 mol. of an aqueous solution of sodium diethyl dithiocarbamate and 200 cc. of acetone may be refluxed on a steam bath for a period of two hours. The acetone should be distilled off and the reaction product separated by cooling, after which the solidified material can be removed by filtration. Upon drying, the yield will be found to be in the neighborhood of 91%. While the product thus obtained is not entirely pure, it is satisfactory without purification for use as an accelerator, either as such or in conjunction with an activator such as diphenylguanidine. A mixture of diphenylguanidine and benzoyl methyl di(diethyl dithiocarbamate) suitable for use in accelerating vulcanization may be prepared by mixing these materials in the ratio of 8.5 grams of diphenylguanidine to 16.5 grams of the dithiocarbamate. The reaction involved in the preparation of benzoyl methyl di(diethyl dithiocarbamate) may be expressed as follows:

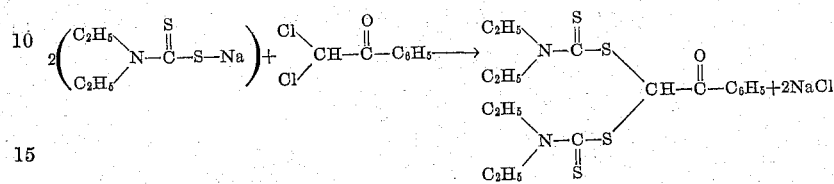

In the preparation of benzoyl methyl diethyl dithiocarbamate, a mixture made up of 23.2 grams (0.15 mol.) of mono chlor acetophenone, 133.2 grams of a solution of 0.15 mol. of sodium diethyl dithiocarbamate in water, and 100 cc. of acetone is refluxed for approximately two hours. Thereafter the acetone is distilled off and the reaction product is permitted to solidify. The resulting solid is then removed by filtration and dried. The dried material, benzoyl metyl diethyl dithiocarbamate, is colorless and is obtained in a yield of approximately 93%. After recrystallization from alcohol, it melts at a temperature of 102–103 degrees C. The product upon analysis will be found to contain an average of 5.50% nitrogen and 25.10% sulphur as compared with the theoretical percentages for benzoyl methyl diethyl dithiocarbamate of 5.24% nitrogen and 23.99% sulphur. The equation representing the reaction is probably as follows:

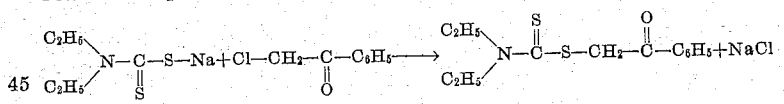

Benzoyl methyl dimethyl dithiocarbamate is prepared similarly by refluxing for approximately ½ hour a mixture made up of 23.2 grams (0.15 mol.) of mono chlor aceto phenone, 140 grams of an aqueous solution of 0.15 mol. of sodium dimethyl dithiocarbamate, and 100 cc. of acetone. The reaction mass is permitted to cool and the resulting solid is segregated, as by filtration, and dried. The product is colorless and is obtained in a yield of approximately 96%. After being recrystallized from alcohol, it melts at 110 degrees C. Upon analysis it will be found to contain an average of 6.02% nitrogen and 27.38% sulphur as compared with the theoretical percentages for benzoyl methyl dimethyl dithiocarbamate of 5.86% nitrogen and 26.77% sulphur.

What is believed to be alpha benzoyl ethyl penta methylene dithiocarbamate is prepared by heating to the refluxing temperature a mixture of 0.20 mol. of an aqueous solution of sodium penta methylene dithiocarbamate, 100 cc. of acetone, and 33.7 grams of chlorinated ethyl phenyl ketone of boiling point 141–143 degrees C. at 45 mm., believed to be principally alpha chlor ethyl phenyl ketone. The heated mixture is allowed to cool, whereupon an oil separates out which solidifies in part on standing. The solid portion, substantially colorless, is obtained after being filtered off and dried in a yield of approximately 25.2 grams. After being washed with pertoleum ether, it melts at 79–81 degrees C.; upon being further purified by recrystallization from alcohol, it melts at 81–82 degrees C. On analysis, it will be found to contain approximately 4.83% nitrogen and 21.70% sulphur as compared with the theoretical percentages for alpha benzoyl ethyl penta methylene dithiocarbamate of 4.78% nitrogen and 21.88% sulphur. The reaction is probably as follows:

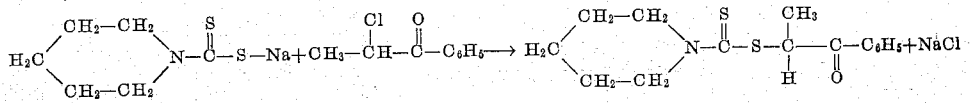

Other compounds which fall within the scope of the invention are benzoyl methyl pentamethylene dithiocarbamate; ortho, meta or para methyl benzoyl methyl dicyclohexyl, dithiocarbamate; benzoyl methyl ethyl cyclohexyl dithiocarbamate; benzol methyl phenyl cyclohexyl dithiocarbamate; para hydroxy benzoyl methyl di(dibutyl dithiocarbamate); alpha (para ethoxy benzoyl) ethyl di isoamyl dithiocarbamate; naphthoyl methyl dimethyl dithiocarbamate; alpha benzoyl propyl dimethyl dithiocarbamate; benzoyl methyl di(cyclohexyl dithiocarbamate); alpha benzoyl ethyl di(diethyl dithiocarbamate); benzoyl methyl di(pentamethylene dithiocarbamate) and the like. These and similar compounds may be prepared by methods analogous to those illustrated above in connection with the preparation of benzoyl methyl di(dimethyl dithiocarbamate), benzoyl methyl di(diethyl dithiocarbamate), benzoyl methyl diethyl dithiocarbamate, benzoyl methyl dimethyl dithiocarbamate and alpha benzoyl ethyl penta methylene dithiocarbamate.

Dithiocarbamates other than those mentioned above as reactants may be employed in the practice of the invention, examples being the dithiocarbamates derived from dibutyl amine, dipropyl amine, dibenzyl amine, dicyclohexyl amine, ethyl cyclohexyl amine, ethyl aniline, methyl cyclohexyl amine, cyclohexyl amine, di tetra hydro furfuryl amine, methyl naphthylamine, di amyl amine, and the like. Also, other halogen derivatives of alkyl aryl ketones may be employed, examples being alpha chlor propyl phenyl ketone, alpha dichlor ethyl phenyl ketone, dibrom acetophenone, di(alpha brom) butyl phenyl ketone, chlor methyl naphthyl ketone, dichlor methyl naphthyl ketone, brom methyl naphthyl ketone, alpha chlor ethyl naphthyl ketone, alpha chlor ethyl para chlor phenyl ketone, chlor methyl ortho nitro phenyl ketone, chlor methyl ortho methoxy phenyl ketone, chlor methyl ortho nitro meta chlor phenyl ketone, dichlor methyl para ethyl phenyl ketone, dibrom methyl para hydroxy phenyl ketone, dichlor methyl para amino phenyl ketone, chlor methyl 1-hydroxy 2-naphthyl ketone, and the like.

The compounds to which the invention relates may be employed as accelerators of vulcanization in substantially any of the standard rubber formulae, one found particularly satisfactory being the following:

| | Parts |
|---|---|
| Extracted pale crepe rubber | 100 |
| Zinc oxide | 5 |
| Sulphur | 3 |
| Stearic acid | 1.5 |
| Accelerator | 0.5 |

Results obtained by the use of compounds of this formula are summarized in the following tables:

| Cure in mins. at ° F. | Ult. tens. kgs./cm.² | Max. elong. in % | Modulus in kgs./cm.² at | |
|---|---|---|---|---|
| | | | 500% | 700% |

*Benzoyl methyl di(dimethyl dithiocarbamate)*

| 15/260 | 104 | 890 | 14 | 36 |
| 20 | 130 | 810 | 20 | 66 |
| 30 | 159 | 745 | 30 | 118 |
| 40 | 182 | 735 | 37 | 164 |

*Benzoyl methyl di(diethyl dithiocarbamate)*

| 20/260 | 90 | 865 | 12 | 34 |
| 30 | 132 | 805 | 30 | 68 |
| 50 | 176 | 740 | 34 | 138 |

*Mixture of diphenylguanidine with benzoyl methyl di(diethyl dithiocarbamate)*

| 10/260 | 17 | 910 | 4 | 7 |
| 20 | 88 | 815 | 13 | 43 |
| 30 | 152 | 770 | 24 | 96 |
| 50 | 198 | 710 | 43 | 190 |

*Benzoyl methyl dimethyl dithiocarbamate, 0.5 part; diphenylguanidine, 0.2 part*

| 40/260 | 20 | 850 | 5 | 10 |
| 60 | 36 | 830 | 7 | 17 |
| 80 | 60 | 760 | 13 | 42 |
| 120 | 92 | 750 | 19 | 67 |

*Alpha benzoyl ethyl penta methylene dithiocarbamate, 0.5 part; diphenylguanidine, 0.2 part*

| 20/285 | 14 | 710 | 7 | 15 |
| 40 | 47 | 810 | 10 | 26 |
| 60 | 66 | 800 | 13 | 37 |
| 80 | 53 | 730 | 15 | 43 |
| 120 | 95 | 780 | 19 | 58 |

The novel compounds to which the invention relates thus possess valuable properties as accelerators of vulcanization. As disclosed in the preceding data, they may be employed either by themselves or in conjunction with activators of the nature of basic organic nitrogen-containing accelerators, of which examples are diphenylguanidine, diortho tolyl guanidine, diphenylguanidine acid oxalate, diortho tolyl guanidine neutral succinate, cyclohexyl ammonium fumarate, dicyclohexyl ethylene diamine, and the high boiling ethylene poly amines such as those boiling between the range of 160 degrees C. at normal pressure and 270 degrees C. at 25 mm. It will be noted that in general the dihalogenated ketone derivatives of the dithiocarbamates are more powerful accelerators than the mono halogen derivatives. Consequently activators will not usually be necessary with the dihalogenated derivatives, although they may be found desirable in certain instances. With the mono halogenated derivatives, on the other hand, activators are in most cases desirable, although not invariably necessary.

This application is, in part, a continuation of application Serial No. 583,824, filed January 25, 1932. It is intended that the patent shall cover, by suitable expression in the appended claims, whatever features of patentable novelty reside in the invention.

What I claim is:

1. A process of treating rubber which comprises vulcanizing the same in the presence of phenacylidene di(dimethyl dithiocarbamate).

2. A process of treating rubber which comprises vulcanizing the same in the presence of phenacylidene di(diethyl dithiocarbamate).

3. The process of treating rubber which comprises vulcanizing the same in the presence of a mixture of diphenylguanidine and phenacylidene di(diethyl dithiocarbamate).

4. A rubber vulcanization accelerator comprising phenacylidene di(diethyl dithiocarbamate).

5. A rubber vulcanization accelerator comprising phenacylidene di(diethyl dithiocarbamate).

6. A rubber vulcanization accelerator comprising phenacylidene di(dimethyl dithiocarbamate).

7. The process of accelerating the vulcanization of rubber which comprises vulcanizing in the presence of a benzoyl substituted methyl ester of a dithiocarbamic acid derived from a secondary amine.

8. The process of accelerating the vulcanization of rubber which comprises vulcanizing in the presence of an alpha aroyl substituted alkyl ester of a dithiocarbamic acid.

9. A compound of the formula

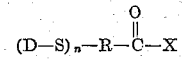

wherein D is a thio carbamyl group, R is alkyl, $n$ is one or two and X is an aromatic radical directly connected in the ring to the C=O group.

10. A rubber vulcanization accelerator comprising an alpha benzoyl substituted alkyl ester of a dithiocarbamic acid derived from a secondary amine.

11. A rubber vulcanization accelerator comprising an alpha aroyl substituted alkyl ester of a dithiocarbamic acid.

12. A method of treating rubber that comprises vulcanizing the same in the presence of a basic organic nitrogen-containing accelerator and an alpha benzoyl substituted alkyl ester of an aliphatic dithiocarbamic acid.

13. A method of treating rubber that comprises vulcanizing the same in the presence of a compound having the formula

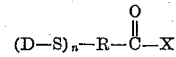

wherein D is a thio carbamyl group, R is alkyl, $n$ is one or two and X is an aromatic radical directly connected in the ring to the C=O group.

14. An alpha benzoyl substituted alkyl ester of an N-alkyl dithiocarbamic acid.

15. The process of accelerating the vulcanization of rubber which comprises vulcanizing a vulcanizable rubber composition in the presence of an alpha benzoyl substituted alkyl ester of a dithiocarbamic acid derived from a secondary amine, said alkyl group having not more than four carbon atoms.

16. The process of accelerating the vulcanization of rubber which comprises vulcanizing a vulcanizable rubber composition in the presence of an alpha aroyl substituted methyl ester of a di(N-substituted dithiocarbamic acid), said aroyl radical being a member of the benzene series.

17. The process of accelerating the vulcanization of rubber which comprises vulcanizing a vulcanizable rubber composition in the presence of a basic nitrogen-containing accelerator and phenacyl dimethyl dithiocarbamate.

18. The process of accelerating the vulcanization of rubber which comprises vulcanizing a vulcanizable rubber composition in the presence of a basic nitrogen-containing accelerator and a phenacyl dialkyl dithiocarbamate derived from a secondary amine.

19. Phenacylidene di(dimethyl dithiocarbamate).

20. A phenacylidene di(di-N-substituted dithiocarbamate).

21. Phenacyl dimethyl dithiocarbamate.

22. An alpha aroyl substituted alkyl ester of an aliphatic dithiocarbamic acid, said aroyl radical being a member of the benzene series.

23. An alpha aroyl substituted alkyl di(dithiocarbamate), said aroyl radical being a member of the benzene series.

24. An aromatic acyl substituted alkyl ester of a di-N-substituted dithiocarbamic acid, said aromatic radical being a member of the benzene series and being directly connected in the ring to the C=O of the acyl radical, and the said alkyl radical containing not more than four carbon atoms.

25. An aromatic acyl substituted methyl ester of a di-N-substituted dithiocarbamic acid, said aromatic radical being a member of the benzene series and being directly connected in the ring to the C=O of the acyl radical.

26. An alpha aroyl substituted alkyl ester of a dithiocarbamic acid.

JOY G. LICHTY.